United States Patent
Ko et al.

(10) Patent No.: US 7,539,519 B2
(45) Date of Patent: May 26, 2009

(54) POWER SAVING METHOD AND APPARATUS FOR MULTIMODE WIRELESS TERMINAL

(75) Inventors: Seong-Yun Ko, Suwon-si (KR); Joo-Yong Park, Gyeonggi-do (KR); Seong-Joon Jeon, Yongin (KR); Myeon-Kee Youn, Incheon (KR)

(73) Assignee: Samsung Electronics Ci., Ltd., Suwon-si, Gyeonggi-do (KR)

( * ) Notice: Subject to any disclaimer, the term of this patent is extended or adjusted under 35 U.S.C. 154(b) by 399 days.

(21) Appl. No.: 11/315,181

(22) Filed: Dec. 23, 2005

(65) Prior Publication Data

US 2006/0154699 A1     Jul. 13, 2006

(30) Foreign Application Priority Data

Jan. 11, 2005    (KR)   .................. 10-2005-0002650

(51) Int. Cl.
*H04B 1/38* (2006.01)
(52) U.S. Cl. .................. 455/574; 455/552.1; 455/553.1
(58) Field of Classification Search ................. 455/574, 455/343.1–5, 435.2–3, 552.1, 553.1
See application file for complete search history.

(56) References Cited

U.S. PATENT DOCUMENTS

| | | | |
|---|---|---|---|
| 6,198,941 B1* | 3/2001 | Aho et al. ................. 455/552.1 |
| 7,039,027 B2* | 5/2006 | Bridgelall .................... 370/329 |
| 7,203,482 B2* | 4/2007 | Blumenthal et al. ......... 455/411 |
| 2003/0220074 A1* | 11/2003 | Wee et al. .................. 455/11.1 |
| 2004/0121804 A1 | 6/2004 | Yukie |
| 2004/0209615 A1* | 10/2004 | Lamb et al. ................. 455/433 |
| 2005/0153736 A1* | 7/2005 | Ganton .................... 455/553.1 |
| 2006/0077956 A1 | 4/2006 | Saksena et al. |
| 2006/0077957 A1* | 4/2006 | Reddy et al. ................ 370/352 |
| 2006/0223536 A1* | 10/2006 | Chia .......................... 455/436 |

FOREIGN PATENT DOCUMENTS

| CN | 1549526 | 11/2004 |
|---|---|---|
| KR | 10-2004-0015585 | 2/2004 |

OTHER PUBLICATIONS

Korean Office Action for Korean Patent Application No. 2005-2650 issued on Sep. 22, 2006.
*Office action* from the Chinese Patent Office issued in Applicant's corresponding Chinese Patent Application No. 200610051379 dated Jan. 18, 2008.

\* cited by examiner

*Primary Examiner*—CongVan Tran
(74) *Attorney, Agent, or Firm*—Robert E. Bushnell, Esq.

(57) ABSTRACT

A method and apparatus save power in a multimode wireless terminal having plural communication modems for supporting different communication systems. The multimode wireless terminal performs its basic functions of reception and transmission, while only one of the communication modems is turned on and the others are turned off so as to reduce power consumption. This results in extension of the utilization time of the multimode wireless terminal.

14 Claims, 6 Drawing Sheets

POWER SAVING METHOD AND APPARATUS FOR MULTIMODE WIRELESS TERMINAL

CLAIM OF PRIORITY

This application makes reference to and claims all benefits accruing under 35 U.S.C. §119 from an application for METHOD FOR SAVING POWER OF COMPLEX WIRELESS PHONE AND APPARATUS THE SAME earlier filed in the Korean Intellectual Property Office on 11 Jan. 2005, and there duly assigned Serial No. 2005-2650.

BACKGROUND OF THE INVENTION

1. Technical Field

The present invention relates to a system supporting multimode wireless terminals and services and, in particular, to an apparatus and method for extending the utilization time of a multimode wireless terminal by reducing power consumption.

2. Related Art

A multimode wireless system is a system which provides multimode terminals with various communication services, such as voice and data services, through different communication networks when the services are required.

In order to implement multimode wireless communication, a terminal must be able to associate with more than two systems that are interoperable. For example, the wireless Internet system and the mobile communication system interoperate with each other to provide a mobile terminal with a shared service. By associating more than two different systems, roaming service is supported and a reasonable payment can be determined, whereby the subscriber can select a system suitable for his or her communication behavior, and it is possible to manage the wireless spectrum efficiently.

The multimode communication service can be implemented with a multimode terminal equipped with a plurality of wireless modems and communication protocols identical to the wireless systems to be associated with. That is, the multimode terminal should have more than two wireless modems and communication protocols. For example, in order for the mobile terminal to access a wireless local area network (WLAN) and a mobile communication system, it should have modems and protocols for both the WLAN and the mobile communication system. Accordingly, a multimode terminal is spatially limited compared to a single mode terminal. Also, since the multimode terminal should communicate, occasionally or constantly, with the multiple wireless systems, its power consumption is likely to be greater than that of the single mode terminal, resulting in the requirement for a power saving scheme.

Studies are being actively conducted to reduce the power consumption of the mobile terminal. However, most of the power-saving methods have been researched without consideration of multimode operations.

In order to reduce the power consumption of the multimode terminal, one could consider using low power consumption devices, such as a wireless modem chip, a high frequency power amplifier, a CPU, etc., that operate with low power or minimal power consumption of the terminal using the power management regulations that are supported by respective wireless communication standards related to the multimode wireless terminal.

In the former method, the power-saving effect wholly depends on the devices with which the terminal is equipped in that power consumption can be reduced as the design technologies of the devices are developed. Accordingly, this method is efficient to reduce the power consumption in voice or user data communication. However, it is limited in its ability to control power consumption in a terminal caused by high level operations, such as determinations of communication times and attempts.

The latter uses power control schemes of the wireless communication standards embedded in the respective modems of the multimode terminal. That is, most of the wireless communication standards specify the power saving schemes, and their procedures in the terminal have the limitation of power capacity, and these schemes are used for reducing power consumption in the terminal. For example, in the IEEE 802.11 standard, the wireless terminal periodically checks the packets transmitted from the access point (AP), and partially turns off the power of the modem during the rest time so as to save power.

The latter method can overcome the limitation of the former method, i.e., the lack of upper level control. However, it is difficult to use the characteristics of a multimode wireless terminal having plural modems.

This is due to the fact that the modems of the multimode wireless terminal do not interoperate with each other, but rather work independently. That is, the modems of the multimode wireless terminal operate according to the regulations defined in the wireless communication standards associated with the respective modems.

Accordingly, each modem periodically tries to connect to the wireless network equipment (AP in WLAN) corresponding to the wireless communication standard. Actually, the multiple modems do not connect to the corresponding wireless communication networks when the terminal has data to be transmitted, but they periodically connect to the corresponding wireless communication networks to determine whether or not there is data to receive. That is, it occurs that the modems connect to the corresponding wireless communication networks even when there is no data to transmit, resulting in a waste of power. Consequently, the latter method is also limited in its ability to reduce power consumption in the terminal.

SUMMARY OF THE INVENTION

The present invention has been developed in an effort to solve the above problem, and it is an object of the present invention to provide an apparatus and method for extending utilization time in the multimode wireless terminal by enabling the multiple modems to cooperate in a complementary manner.

It is another object of the present invention to provide an apparatus and method for reducing power consumption in the multimode wireless terminal by saving the power applied to the modems during call waiting times.

It is another object of the present invention to provide an apparatus and method for reducing power consumption in the multimode wireless terminal by operating only one of the multiple modems during the call waiting times.

It is still another object of the present invention to provide an apparatus and method for extending utilization time in the multimode wireless terminal.

In order to achieve the above objects, the power saving method for a multimode wireless terminal which includes at least two modems for processing data from different communication networks includes: applying power to a first modem supporting a first communication network when a main power of the multimode wireless terminal is turned on; registering connection information on the multimode wireless terminal with a terminal information management system of the first communication network using the first modem; applying power to a second modem for connecting to a second communication network in response to an accessible network information request; determining whether or not the multimode wireless terminal can access the second communication network using the second modem; selecting one of the first and second communication networks using the second modem; and establishing connection to the selected communication network.

Preferably, the connection information includes a unique terminal number of the multimode wireless terminal and connection information, including a location and identification information of the multimode wireless terminal.

Preferably, the step of applying the power to a second modem includes executing a requested command when call processing for receiving/transmitting a call or accessible network information is requested.

Preferably, the step of determining accessibility to the second communication network includes determining whether or not the multimode wireless terminal can access equipment constituting the second communication network.

Preferably, the step of determining accessibility to the second communication network includes determining whether the second modem can be connected to a neighboring access point (AP) if the second communication network is a wireless local area network (WLAN).

Preferably, the step of selecting the communication network includes selecting the second communication network if the second communication network is accessible, and selecting the first communication network if the second communication network is not accessible, as a result of determining the accessibility to the second communication network.

Preferably, the first communication network is a mobile communication network and the second communication network is a wireless local area network.

Preferably, the step of registering the connection information includes registering a mobile communication network number, location information, an IP address, and a unique terminal number of the multimode wireless terminal.

In another aspect of the present invention, the multimode wireless terminal comprises: a user interface part providing an interface with the user; a first communication modem controlling transmission and reception of voice and data through a first communication network, and operating in the range of a first communication network standard if main power of the multimode wireless terminal is turned on; a second communication modem controlling transmission and reception of voice and data through a second communication network, and operating upon receiving a control signal for turning on the power of the second communication modem; and a main control part for controlling operation of the multimode wireless terminal according to a control command of a user inputted through the user interface part and a previously configured multimode wireless terminal control command.

Preferably, the main control part generates a control signal for turning on the second communication modem when call processing is requested for receiving and transmitting voice and data so as to transmit voice and data.

Preferably, the second communication modem starts operating in response to the control signal, and determines whether or not the multimode wireless terminal can access the second communication network.

Preferably, the second communication modem determines whether or not to connect to network equipment constituting the second communication network on the basis of a wireless communication standard specified for the second communication network, so as to determine whether or not the multimode wireless communication can access the second communication network.

Preferably, the second communication modem determines whether or not the second communication modem can access neighboring access device (AP) when the second communication network is a wireless local area network (WLAN).

Preferably, the main control part exercises control so as to perform requested call processing through the second communication network when the second communication network is accessible, and through the first communication network when the second communication network is not accessible.

Preferably, the first communication network is a mobile communication network and the second communication network is a wireless local area network (WLAN).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Preferred embodiments of the present invention will be described hereinafter with reference to the accompanying drawings in detail.

Wherever possible, the same reference numbers will be used throughout the drawing(s) to refer to the same or like parts. Also, the embodiments are shown and described in sufficient detail to enable those skilled in the art to practice the invention and the description of the well known functions or constructions that may dim the point of the invention will be omitted.

Figure 1:
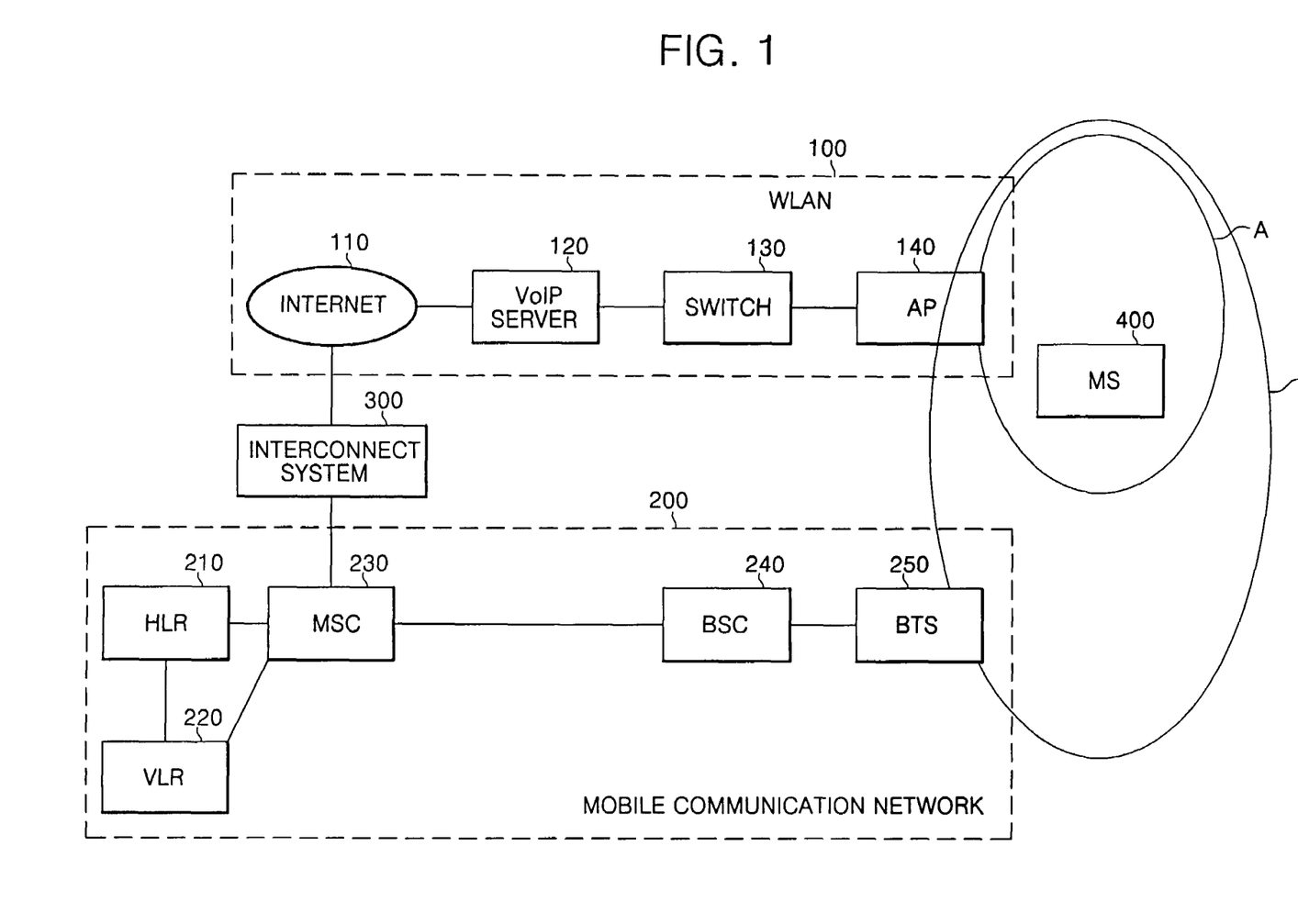
FIG. 1 is a block diagram of a composite wireless system according to the present invention.

FIG. 1 is a block diagram of a composite wireless system according to the present invention. Referring to FIG. 1, a mobile station (MS) 400 has multiple radio interfaces so as to communicate with a wireless internet system 100 and a mobile communication system 200. The wireless internet system 100 includes an internet 110, a Voice-over-Internet Protocol (VoIP) server 120, a switch 130, and an access point (AP) 140. The mobile communication system 200 includes a home location register (HLR) 210, a visitor location register (VLR) 220, a mobile switching center (MSC) 230, a base station controller (BSC) 240, and a base station transceiver subsystem (BTS) 250.

In FIG. 1, the MS 400 is located in an area in which the coverage areas A and B of the AP 140 and the BTS 250, respectively, overlap. In this case, the MS 400 can simultaneously access the wireless internet system 100 and the mobile communication system 200 through the AP 140 and the BTS 250, respectively, using the wireless internet interface and the mobile communication interface. That is, the MS 400 can perform voice and data communication through the BTS 250 and the AP 140, which are included in different respective systems.

The wireless internet system 100 and the mobile communication system 200 are connected through an interconnect system 300 such that the two different systems can exchange voice and data. The VoIP server 120, the HLR 210, and the VLR 220 share system management information, such as basic MS information and user information, with the MS 400 by exchanging control messages.

The wireless internet representative for a wireless local area network (WLAN) and the mobile communication system representative for a code division multiple access (CDMA) and Global System for Mobile communication (GSM) differ in service coverage, frequency bandwidths, and service charges. Accordingly, a user having a multimode terminal selects one of two communication system in consideration of his/her situation and the utilization object.

Typically, the WLAN has an accessible area smaller than that of the mobile communication system such that access to the WLAN is limited. However, the WLAN is advantageous in view of its low service charge and wide bandwidth.

The mobile communication system has a relatively large service area and is well designed so as to secure the quality of service (QoS), but it is expensive and has a bandwidth limitation in comparison to the WLAN.

Accordingly, a user can consider using the WLAN in order to economize on cost if the user can access the WLAN at his location, even when in the service area of a mobile communication system.

Figure 2:
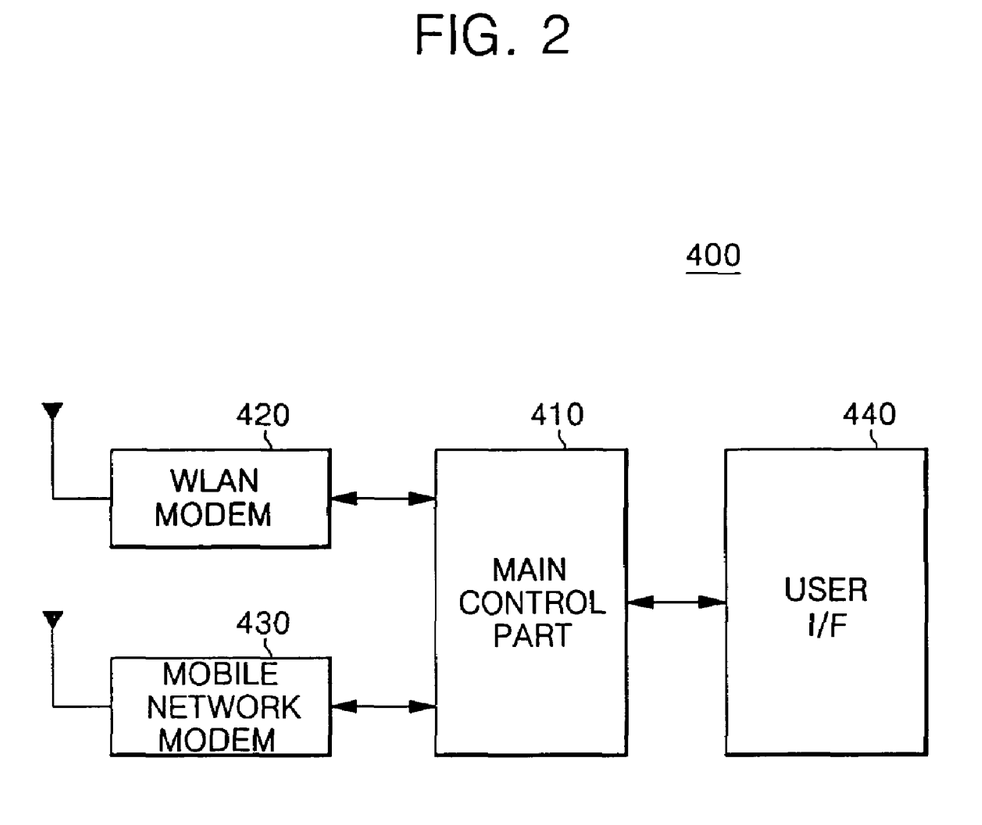
FIG. 2 is a schematic block diagram of a multimode wireless terminal according to the present invention.

FIG. 2 is a schematic block diagram of a mobile station or multimode wireless terminal according to one embodiment of the present invention. Referring to FIG. 2, the mobile station (MS) or multimode mobile terminal 400 includes a main control part 410, a WLAN modem 420, a mobile network modem 430, and a user interface 440. In FIG. 2, common and well-known devices, such as a display and a voice input/output part, are not depicted.

The user interface 440 provides the user with the ability to manipulate the multimode wireless terminal 400, and the main control part 410 controls the entire operation of the multimode wireless terminal 400.

The WLAN modem 420 controls the reception and transmission of voice and data through the WLAN, and the mobile network modem 430 controls the reception and transmission of voice and data through the mobile communication system.

The mobile network modem 430 should operate in a power range satisfying the corresponding wireless network standard until the main power of the multimode wireless terminal 400 turns off. That is, the mobile network modem 430 maintains a constant "on" state while main power of the multimode wireless terminal 400 is on.

The WLAN modem 420 is turned off when there is no call processing for receiving or transmitting data, i.e., during a call waiting state. That is, the WLAN modem 420 maintains a "power off" state until it receives a specific control signal (for example, connect_enable_local) from other devices of the multimode wireless terminal 400, such as main control part 410. The WLAN modem 420 does not decode any of the signals from the AP.

The connect_enable_local signal is generated by the main control part 410 according to the user's intention, and is transmitted to the WLAN modem 420 when call processing is 3 required for receiving and transmitting signals.

Upon receiving the connect_enable_local signal, the WLAN modem 420 performs a preparation procedure for communicating with the WLAN system. The WLAN modem 420 determines whether the multimode wireless terminal 400 can access the WLAN in the present area, and controls data communication through the local network when the WLAN is accessible. In order to connect to the WLAN, preferably, the WLAN modem 420 determines whether or not to connect with the corresponding AP after performing a predetermined procedure with neighboring APs.

For example, the WLAN modem 420 determines whether or not there is any neighboring AP with which to communicate. This is called a scan process. Through the scan process, the WLAN modem 420 obtains information on candidate APs. The information includes the addresses of the candidate APs and physical layer parameters. If a plurality of candidate APs exists, the WLAN modem 420 selects one of the candidate APs, and then an authentication procedure is performed. Through the authentication process, only authorized terminals can be associated with the WLAN, and the AP identifies the terminal and user, and reports the authentication result to the terminal. If the terminal passes the authentication process, the terminal requests to be associated with the AP. Through these sequential processes, the terminal and the AP are set to communicate data with each other in the physical layer and in the media access control (MAC) layer. Consequently, the terminal determines whether or not the conditions required by a specific application can be supported. This process is performed at the application layer in order to determine whether or not the requirement of the specific 3 application is satisfied. For example, in the case of voice communication between terminals and the AP, the voice packet should be transmitted with a limited size of propagation delay. To satisfy this requirement, the VoIP server managing the corresponding AP monitors the traffic load of the AP, and restricts the access of new terminals if the traffic load exceeds the AP's capacity. If the terminal passes all of the processes, the multimode wireless terminal 400 can access the WLAN.

The WLAN modem 420 provides the user with the determination result through the main control part 410, and operates according to the user's manipulation information.

The WLAN modem 420 maintains a power-off state during the call waiting state such that power consumption of the multimode wireless terminal 400 can be reduced.

Figure 3:
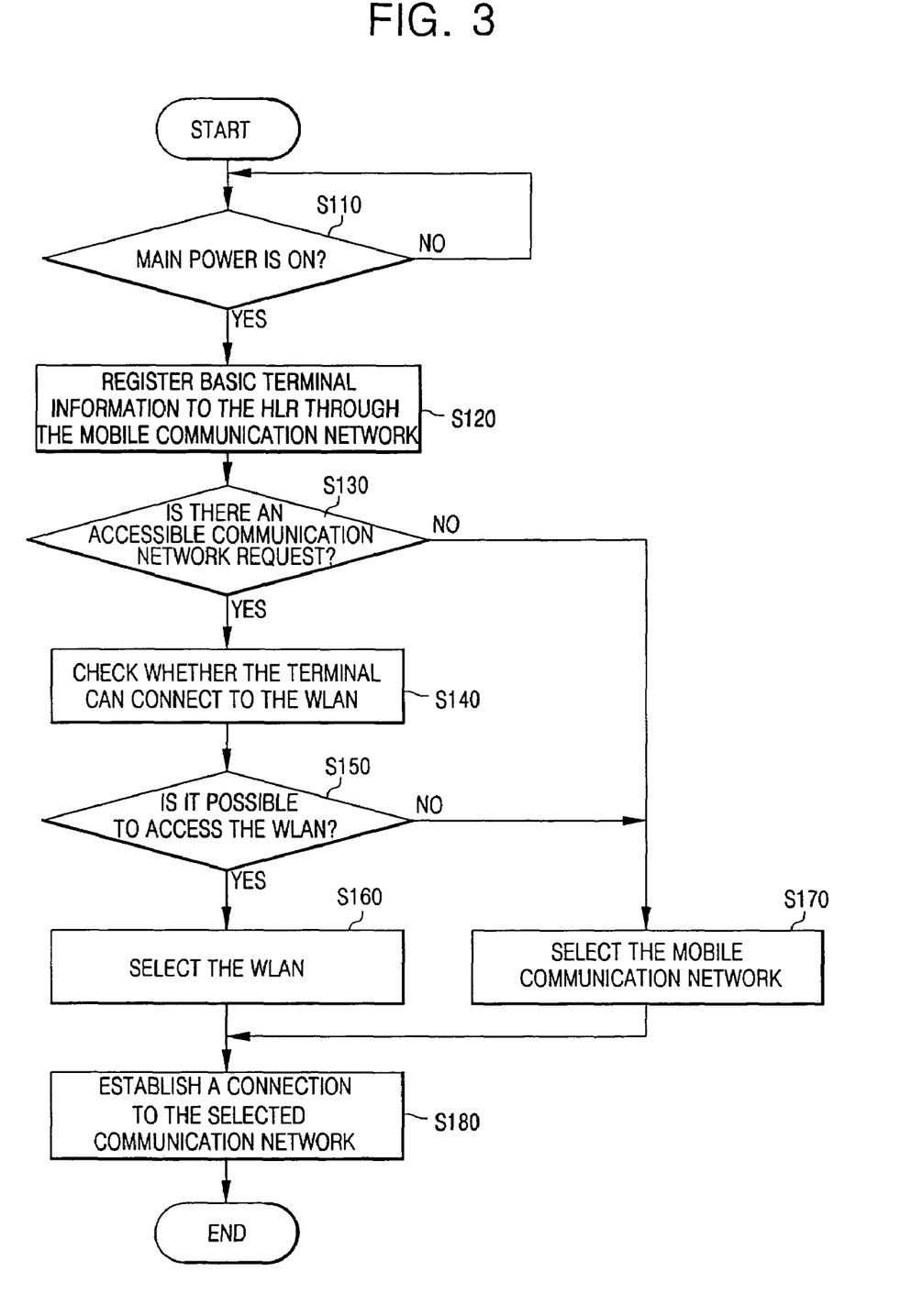
FIG. 3 is a flowchart of a power saving method of a multimode wireless terminal according to one embodiment of the present invention.

FIG. 3 is a flowchart of a power saving method of the multimode wireless terminal according to one embodiment of the present invention. Referring to FIG. 1, FIG. 2 and FIG. 3, the power saving method of the multimode wireless terminal 400 according to the embodiment of the present invention will be described.

Once the main power of the multimode wireless terminal 400 turns on at step S110, the multimode wireless terminal 400 registers its basic terminal information with the HLR 210 at step S120. At this time, the mobile network modem 430 of the multimode wireless terminal 400 is in the "on" state, and the WLAN modem 420 is in the "off" state. The basic terminal information registered with the HLR 210 is shown, by way of example, in FIG. 4. The basic terminal information registered with the HLR 210 is shared with the VoIP server 120 through an intermediate system (for example, the interconnect system 300 in FIG. 1) interconnecting the mobile communication network 200 and the WLAN 100.

Sequentially, if the system requests accessible AP information at step S130, the multimode wireless terminal 400 determines which WLAN (AP) is accessible at step S140. That is, if there is any reception/transmission request or accessible communication network information request through the user interface 440, the main control part 410 of the multimode wireless terminal 400 transmits the connect_enable_local signal to the WLAN modem 420 so as to determine whether or not the multimode wireless terminal 400 can access the WLAN. At this time, the power of the WLAN modem 420 is turned on.

If it is determined at step S140 that an accessible WLAN exists, the multimode wireless terminal 400 selects the WLAN 100 at step S160. On the other hand, if there is no accessible WLAN, the multimode wireless terminal 400 selects the mobile communication network 200 at step S170, and prepares a connection to the selected communication network at step S180. When the multimode wireless terminal 400 is set to communicate voice and data with only the mobile communication network 200, steps S150 and S160 are skipped. That is, the multimode wireless terminal 400 is set to connect to the mobile communication network 200 without performing the network selection process.

Figure 4:
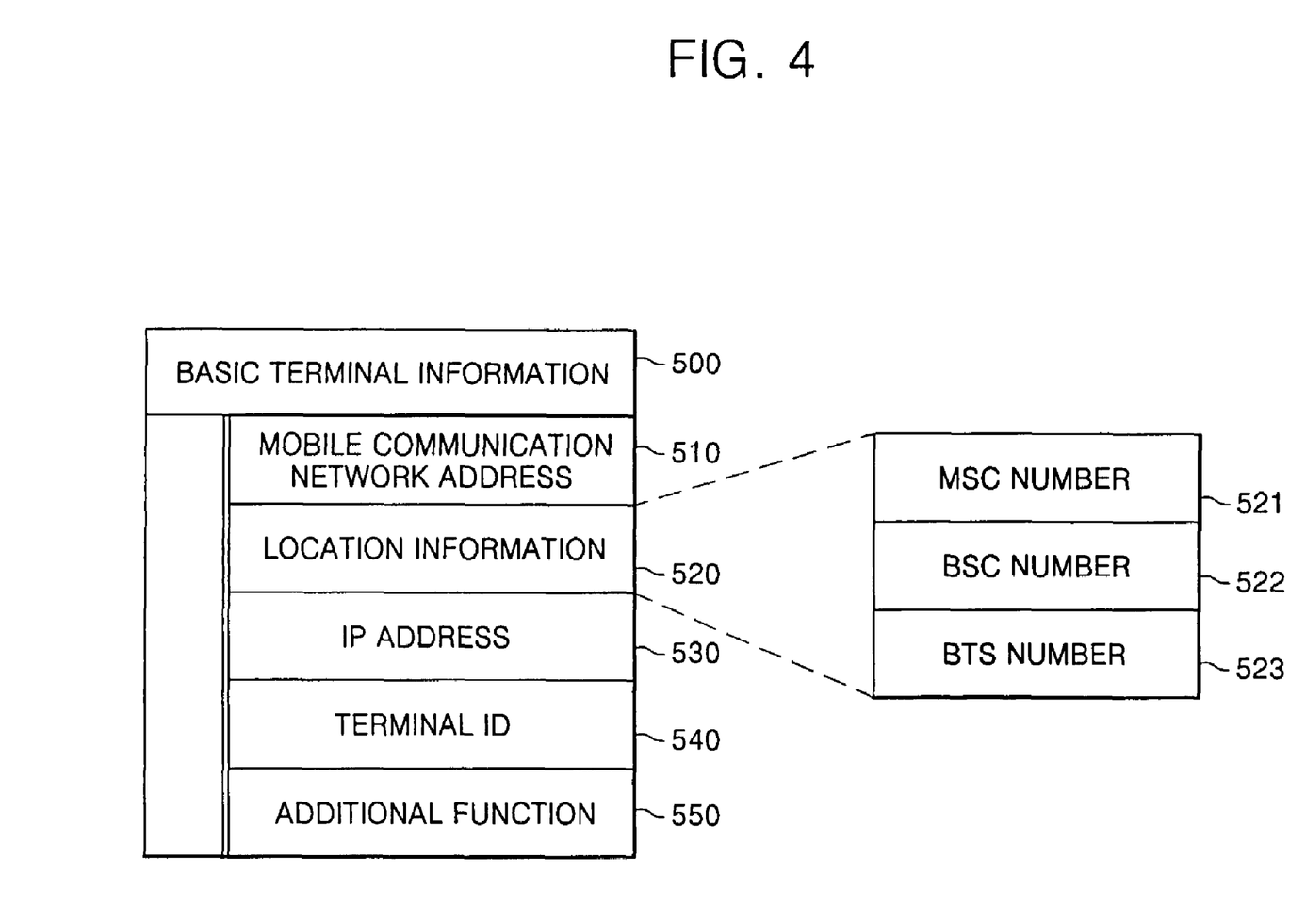
FIG. 4 is a conceptual view of a registration information format according to one embodiment of the present invention.

FIG. 4 is a conceptual view of a registration information format according to one embodiment of the present invention. Referring to FIG. 4, the basic terminal information 500 registered with the HLR 210 by the multimode wireless terminal 400 at step S120 of FIG. 3 includes a mobile communication network address 510, location information 520, IP address 530, a terminal ID 540, and an additional function 550. Particularly, the location information 520 includes MSC number 521, BSC number 522, and BTS number 523 of the associated mobile communication network.

Figure 5:
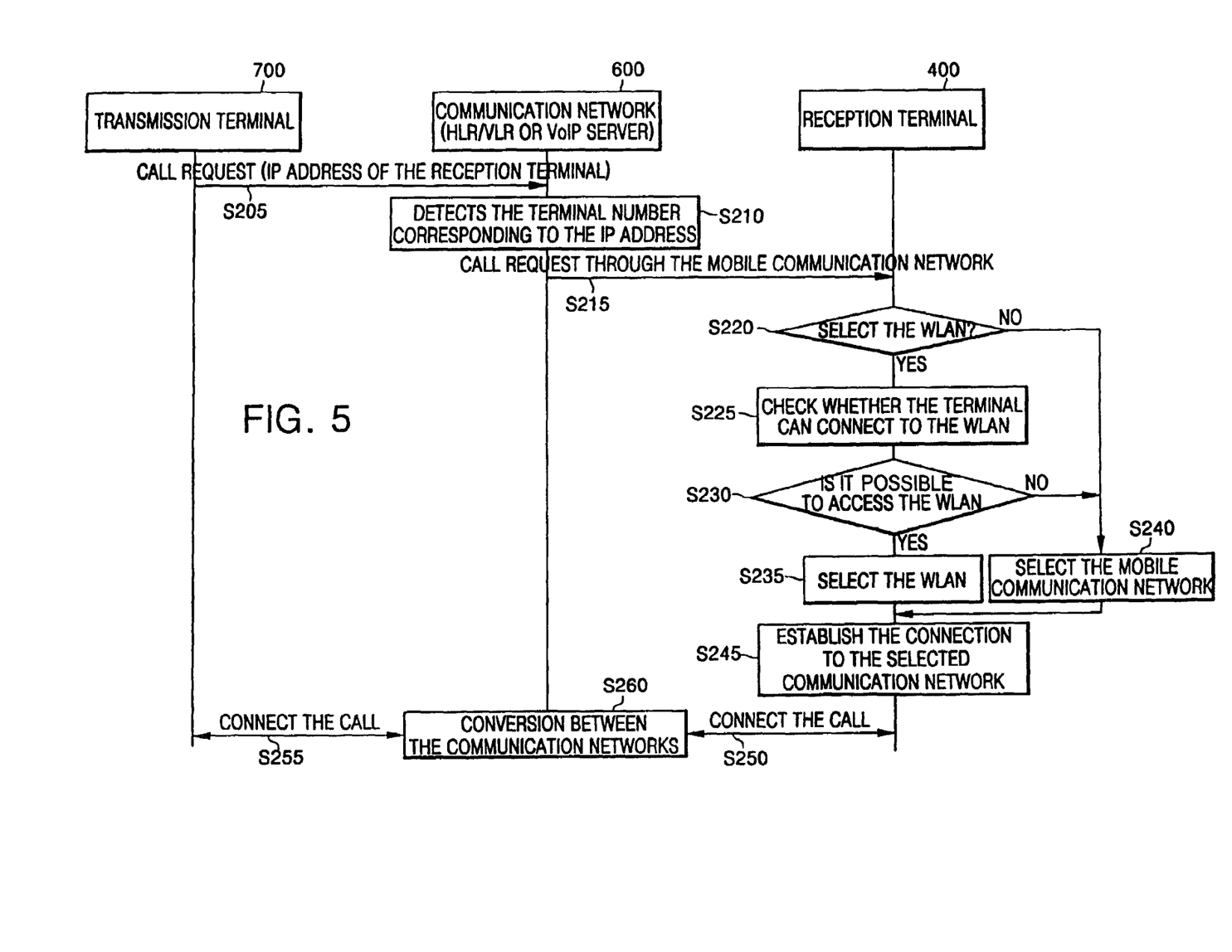
FIG. 5 is a message flow chart of a call processing procedure carried out according to one embodiment of the present invention when a multimode wireless terminal is requested to receive a call.
Figure 6:
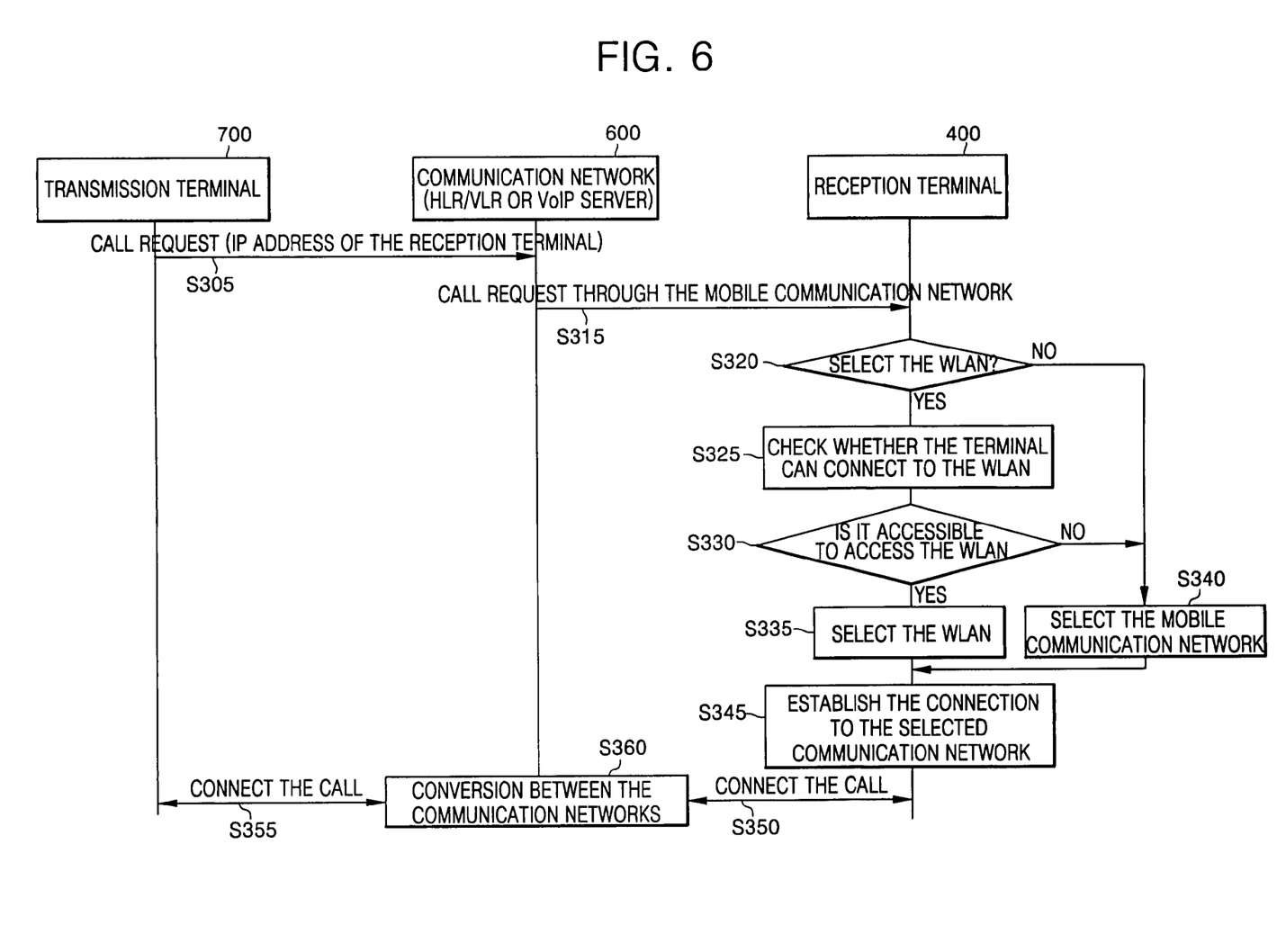
FIG. 6 is a message flow chart of a call processing procedure carried out according to another embodiment of the present invention when a multimode wireless terminal is requested to receive a call.

FIG. 5 and FIG. 6 are message flowcharts of call processing procedures carried out according to respective embodiments of the present invention when a multimode wireless terminal is requested to receive a call.

FIG. 5 shows a reception procedure when the transmission terminal 700 connected to the mobile communication network and the WLAN refers to the IP address of a reception terminal 400, and tries to call the reception terminal 400, and FIG. 6 shows a reception 11 procedure when the transmission terminal 700 connected to the mobile communication network and the WLAN refers to the receiver ID of the reception terminal 400, and tries to call the reception terminal 400. In these examples, the transmission terminal 700 is a terminal which can be associated with one of the mobile communication network and the WLAN, and the reception terminal 400 is a terminal which can be associated with the mobile communication network and the WLAN (for example, a multimode wireless terminal).

Referring to FIG. 5, if the transmission terminal 700 connected to one of the mobile communication network and the WLAN requests a call using the IP address of the reception terminal 400 at step S205, the communication network 600 retrieves the basic information saved during the registration, and selects the terminal number of the reception terminal 400 corresponding to the IP address at step S210. When the transmission terminal 700 is connected to the mobile communication network, the communication network 600 of FIG. 5 becomes the mobile communication network such that the step S210 is carried out by retrieving the basic 3 information of the reception terminal 400 previously saved in the HLR/VLR of the mobile communication system. When, on the other hand, the transmission terminal 700 is connected to the WLAN, the communication network 600 of FIG. 5 becomes the WLAN such that step S210 is performed by retrieving the information of the VoIP server which shares the information of HLR/VLR of the mobile communication network.

If the communication network 600 retrieves the terminal number of the reception terminal 400 at step S210, the communication terminal 600 request a call to the reception terminal 400 through the mobile communication network with the retrieved terminal number at step S215.

Upon reception of the call request, the reception terminal 400 determines whether or not use of the WLAN is allowed at step S220. That is, the reception terminal 400 determines that only the mobile communication network is allowed, and that the WLAN is limited in use. When use of the WLAN is allowed, the reception terminal 400 determines whether it can connect to the WLAN at step S225. In other words, the control part of the reception terminal 400 transmits the connect_enable_local signal to turn on the WLAN modem, and checks that there is a neighboring AP to which a connection can be made. Since the neighboring AP checking procedure is similar to the procedure described above for the WLAN modem of FIG. 2, it will not be described further here. Sequentially, the reception terminal determines whether or not to connect to the WLAN on the basis of the result of the neighboring AP checking procedure. If it is determined at step S230 that the WLAN connection is possible, the reception terminal 400 selects the WLAN at step S235, and establishes a connection with WLAN at step S245.

On the other hand, if it is determined at step S225 that the WLAN is limited in use or that the reception terminal 400 cannot access the WLAN, the reception terminal 400 selects the mobile communication network at step S240, and establishes the connection at step S245.

If the reception terminal 400 has determined the network through which the reception terminal 400 will communicate the voice or data with the transmission terminal, and has established the connection to the network, the reception terminal 400 establishes the call at step S250. In the meantime, the transmission terminal 700 establishes a call through the communication network used for requesting the call to the reception terminal at step S255.

When the transmission terminal 700 and the reception terminal 400 have established calls through different communication networks, the two communication networks interoperate so as to enable the transmission terminal 700 and the reception terminal 400 to communicate with each other. For example, when the transmission terminal 700 has connected to the mobile communication network in order to request communication with the reception terminal 400, but the reception terminal 400 has selected the WLAN for receiving the data, data conversion (for example, communication protocol conversion) should be performed between the mobile communication network and the WLAN. That is, the mobile communication network-based data transmitted from the transmission terminal 700 should be transcoded into WLAN based-data so that the reception terminal 400 can receive the transcoded data.

Referring to FIG. 6, if the transmission terminal 700 is connected to the mobile communication network or the WLAN, and requests a call using the mobile communication number of the reception terminal 400 at step S305, the communication network 600 sends a call request to the reception terminal 400, according to the call number of the reception terminal 400, through the mobile communication network at step S315.

Upon receiving the call request, the reception terminal 400 selects the communication network to use for receiving the data through the sequential procedure illustrated in FIG. 5, and then establishes a connection to the selected communication network.

The sequential processes from steps S320 to S360 illustrated in FIG. 6 are similar to the processes performed in steps S220 to S260 illustrated in FIG. 5. Accordingly, the processes from steps S220 to S260 are not described.

As described above, the embodiment of the present invention has been described such that the power saving method for a multimode wireless terminal is performed by controlling the power of the WLAN modem in the case of interoperation between the mobile communication network and the WLAN. However, the power saving method is not limited to the mobile communication network and the WLAN, but can be adopted to the case wherein at least two different communication networks interoperate by turning on one of a plurality of different network-based modems. Thus, the invention is not limited to the disclosed embodiments, but, on the contrary, is intended to cover various modifications and equivalent arrangements included within the spirit and scope of the appended claims.

As also described above, in the present invention, the basic functions of the multimode wireless terminal can be performed in the reception and transmission modes even though only one of the modems supporting different communication systems is turned on. As a result it is possible to reduce the power consumption of the multimode wireless terminal, resulting in extension of its utilization time.

Although embodiments of the present invention have been described in detail hereinabove, it should be clearly understood that many variations and/or modifications of the basic inventive concepts herein taught may appear to those skilled in the art, and will still fall within the spirit and scope of the present invention, as defined in the appended claims.

What is claimed is:

1. A power saving method for a multimode wireless terminal which includes at least two modems for processing information for different communication networks, said method comprising the steps of:
    registering connection information of the multimode wireless terminal with a terminal information management equipment through a first communication network from a first modem of the multimode wireless terminal when a main power of the multimode wireless terminal is turned on;
    determining whether a second modem of the multimode wireless terminal receives a turn-on signal from a main controller of the multimode wireless terminal when a call-processing is not existing;
    maintaining the second modem in a power-off state when the turn-on signal is not received by the second modem, and placing the second modem in a power-on state for establishing a connection to a second communication network when the turn-on signal is received by the second modem; and
    selecting one of the first and second communication networks to be accessible when the call-processing is existing;
    wherein the connection information includes a unique terminal number of the multimode wireless terminal and a location and identification information of the multimode wireless terminal.

2. The power saving method of claim 1, wherein electric power is applied to the second modem when at least one of call processing and accessible network information is requested.

3. The power saving method of claim 1, wherein the step of determining whether the second modem of the multimode wireless terminal receives the turn-on signal comprises determining whether the second modem of the multimode wireless terminal can access equipment constituting the second communication network.

4. The power saving method of claim 1, wherein the step of selecting one of the first and second communication networks comprises selecting the second communication network when the second communication network is accessible, and selecting the first communication network when the second communication network is not accessible, as a result of determining whether the second modem of the multimode wireless terminal receives the turn-on signal.

5. The power saving method of claim 4, wherein the first communication network is a mobile communication network and the second communication network is a wireless local area network.

6. A power saving method for a multimode wireless terminal which includes at least two modems for processing information for different communication networks, said method comprising the steps of:
    registering connection information of the multimode wireless terminal with a terminal information management equipment through a first communication network from a first modem of the multimode wireless terminal when a main power of the multimode wireless terminal is turned on;
    determining whether a second modem of the multimode wireless terminal receives a turn-on signal from a main controller of the multimode wireless terminal when a call-processing is not existing;
    maintaining the second modem in a power-off state when the turn-on signal is not received by the second modem, and placing the second modem in a power-on state for establishing a connection to a second communication network when the turn-on signal is received by the second modem; and
    selecting one of the first and second communication networks to be accessible when the call-processing is existing;
    wherein the step of determining whether the second modem of the multimode wireless terminal receives the turn-on signal comprises determining whether the second modem of the multimode wireless terminal can access equipment constituting the second communication network; and
    wherein the step of determining whether the second modem of the multimode wireless terminal receives the turn-on signal comprises determining whether the second modem can be connected to a neighboring access point (AP) when the second communication network is a wireless local area network (WLAN).

7. A power saving method for a multimode wireless terminal which includes at least two modems for processing information for different communication networks, said method comprising the steps of:
    registering connection information of the multimode wireless terminal with a terminal information management equipment through a first communication network from a first modem of the multimode wireless terminal when a main power of the multimode wireless terminal is turned on;
    determining whether a second modem of the multimode wireless terminal receives a turn-on signal from a main controller of the multimode wireless terminal when a call-processing is not existing;

maintaining the second modem in a power-off state when the turn-on signal is not received by the second modem, and placing the second modem in a power-on state for establishing a connection to a second communication network when the turn-on signal is received by the second modem; and selecting one of the first and second communication networks to be accessible when the call-processing is existing;

wherein the step of registering the connection information comprises registering a mobile communication network number, location information, an IP address, and a unique terminal number of the multimode wireless terminal.

8. An apparatus for a multimode wireless terminal which includes at least two modems for processing information for different communication networks, said apparatus comprising:

means for registering connection information of the multimode wireless terminal with a terminal information management equipment through a first communication network from a first modem of the multimode wireless terminal when a main power of the multimode wireless terminal is turned on;

means for determining whether a second modem of the multimode wireless terminal receives a turn-on signal from a main controller of the multimode wireless terminal when a call-processing is not existing;

means for maintaining the second modem in a power-off state when the turn-on signal is not received by the second modem, and for placing the second modem in a power-on state for establishing a connection to a second communication network when the turn-on signal is received by the second modem; and means for selecting one of the first and second communication networks to be accessible when the call-processing is existing;

wherein the connection information includes a unique terminal number of the multimode wireless terminal and a location and identification information of the multimode wireless terminal.

9. The apparatus of claim 8, wherein electric power is applied to the second modem when at least one of call processing and accessible network information is requested.

10. The apparatus of claim 8, wherein the determining means determines whether the second modem of the multimode wireless terminal can access equipment constituting the second communication network.

11. The apparatus of claim 8, wherein the selecting means selects the second communication network when the second communication network is accessible, and selects the first communication network when the second communication network is not accessible, as a result of determining whether the second modem of the multimode wireless terminal receives the turn-on signal.

12. The apparatus of claim 11, wherein the first communication network is a mobile communication network and the second communication network is a wireless local area network.

13. An apparatus for a multimode wireless terminal which includes at least two modems for processing information for different communication networks, said apparatus comprising:

means for registering connection information of the multimode wireless terminal with a terminal information management equipment through a first communication network from a first modem of the multimode wireless terminal when a main power of the multimode wireless terminal is turned on;

means for determining whether a second modem of the multimode wireless terminal receives a turn-on signal from a main controller of the multimode wireless terminal when a call-processing is not existing;

means for maintaining the second modem in a power-off state when the turn-on signal is not received by the second modem, and for placing the second modem in a power-on state for establishing a connection to a second communication network when the turn-on signal is received by the second modem; and means for selecting one of the first and second communication networks to be accessible when the call-processing is existing;

wherein the determining means determines whether the second modem of the multimode wireless terminal can access equipment constituting the second communication network; and wherein the determining means determines whether the second modem can be connected to a neighboring access point (AP) when the second communication network is a wireless local area network (WLAN).

14. An apparatus for a multimode wireless terminal which includes at least two modems for processing information for different communication networks, said apparatus comprising:

means for registering connection information of the multimode wireless terminal with a terminal information management equipment through a first communication network from a first modem of the multimode wireless terminal when a main power of the multimode wireless terminal is turned on;

means for determining whether a second modem of the multimode wireless terminal receives a turn-on signal from a main controller of the multimode wireless terminal when a call-processing is not existing;

means for maintaining the second modem in a power-off state when the turn-on signal is not received by the second modem, and for placing the second modem in a power-on state for establishing a connection to a second communication network when the turn-on signal is received by the second modem; and means for selecting one of the first and second communication networks to be accessible when the call-processing is existing;

wherein the registering means registers a mobile communication network number, location information, an IP address, and a unique terminal number of the multimode wireless terminal.

* * * * *